Sept. 18, 1973   L. J. GEIGER, JR., ET AL   3,759,699
PROCESS FOR MELTING SCRAP WITH A PLURALITY OF OPPOSITELY
DIRECTED HEATING MEANS
Original Filed Aug. 11, 1967

SECTION AT LOWER BURNERS

SECTION AT UPPER BURNERS

United States Patent Office 3,759,699
Patented Sept. 18, 1973

3,759,699
PROCESS FOR MELTING SCRAP WITH A PLURALITY OF OPPOSITELY DIRECTED HEATING MEANS
Lewis J. Geiger, Jr., Edison, and James W. Estes, Piscataway, N.J., assignors to Airco, Inc., New York, N.Y.
Original application Aug. 11, 1967, Ser. No. 659,946, now Patent No. 3,603,571, dated Sept. 7, 1971. Divided and this application Apr. 21, 1971, Ser. No. 136,184
Int. Cl. C21c 1/02
U.S. Cl. 75—43
6 Claims

ABSTRACT OF THE DISCLOSURE

In a shaft furnace, method for melting low density metallic scrap. Burners and/or tuyeres are located at two different levels in the body portion of the furnace. The charge is preheated by hot gases rising in the furnace stack, and melted at the upper burner level. As the molten metal trickles down over a support bed, which may either be coke, other type of carbon, or a refractory material, it is superheated to the desired spout temperature, and to provide a product of the desired analysis. A feature is the configuration of burners which imposes a swirling motion on gases entering the furnace.

BACKGROUND OF INVENTION

This is a division of our copending application for Process and Apparatus for Melting Scrap Metal, filed Aug. 11, 1967, as application Ser. No. 659,946, now Pat. No. 3,603,571, issued Sept. 7, 1971, and entitled Apparatus for Melting Scrap Metal.

This relates in general to the processing or melting of metal in shaft furnaces, and more particularly to the melting of low density metallic scrap to liquid metal of specified analyses.

In the prior art, it has been difficult to process scrap comprising borings, turnings, and other types of low density metallic material, because of the excessive oxidation which such materials sustain, and also, because of the high volume-to-weight ratio in materials of this type. Accordingly, certain preconditioning processes were necessary, such as, for example, binding together a group of materials called "bundling," which ultimately raised the expense of the process. Moreover, under prior practices, it has been difficult to regulate the final tap temperature of the molten metal product, or the volume of the gas passing through the furnace, so as to precisely control the analysis of the final metal product. Finally, metal melting operations as carried out in the prior art are known to contribute heavily to air pollution.

Accordingly, it is the general object of this invention to provide a process of improved efficiency over the prior art for melting low density scrap, such as borings, turnings, sheet bundles, tube mill scrap, bunchings, and sheet trimmings, which are melted with difficulty. More particular objects of the invention are to more precisely control the superheating of the molten charge, and hence, the analysis of the final product. Another object of the invention is to reduce air pollution products contributed by metal processing furnaces.

BRIEF DESCRIPTION OF THE INVENTION

These and other objects are accomplished in accordance with the method of the present invention which is carried out in a shaft furnace having a preheating zone, a melting zone, and a superheating zone. The metal charge, which is preheated by rising gases in the stack portion, is melted in the melting zone by heat supplied from upper level oxy-fuel burners. The molten metal then trickles down over a porous support bed, and is simultaneously superheated to the desired spout temperature by heat supplied from a lower set of burners or tuyeres, the upper and lower burners or tuyeres being especially arranged to produce turbulence in the gases rising in the furnace.

In one example of practice of the present invention, metal scrap, comprising, for example, a major portion of iron, is charged into the top of the furnace. One row of oxy-fuel burners which is disposed at a level above a bed of coke, serves together with rising gases to preheat the charge and to provide a major part of the latent heat of fusion. A second row of tuyeres, at a substantially lower level in the coke bed, serves either to house oxy-fuel burners, or to convey separately highly enriched air to support combustion of the coke, thereby superheating the molten metal, as it trickles down through the coke, to the desired spout temperature. It will be understood that at either the upper or lower level, the burners can be employed with or without an auxiliary air blast through the tuyeres.

In accordance with a modification of the invention, the coke bed can be replaced with inert refractory material, such as magnesia, lime, calcium carbide, or alumina, which is also heated by means of oxy-fuel burners in the lower set of tuyeres for the purpose of superheating the molten metal as it descends. The purpose of this modification is to remove from the furnace certain components which may be detrimental to the metallic product, and add others which may be beneficial. For example, the presence of sulphur in coke is detrimental to the melting of copper; hence, the coke is replaced with a support bed of alumina. In another example, special support media such as calcium oxide and calcium carbonate have been found to contribute to the desulphurization and dephosphorization of scrap steel.

One feature of the processes of the present invention is that the melting rate of the molten metal can be controlled by the firing rate of the oxy-fuel burners firing directly on the preheated scrap as it descends into the melting zone.

Another feature of the invention is the arrangement of the burners to impose a swirling motion on gas passing into the furnace. In accordance with a particular configuration disclosed, each of the burner barrels is so directed that it makes an angle of approximately 15 degrees with the radius of the circular-cross-sectioned furnace. In a preferred arrangement, the burner barrels at one furnace level are directed at clockwise angles with the radius, whereas at the other level, they are oppositely directed, thus causing the entering gases to swirl in opposite directions. Moreover, the burners are each directed downwardly at an angle of between 10 and 15 degrees with the horizontal. Because of this particular burner configuration, the contact time between hot burner gases and the scrap charge is substantially increased over that usual in the prior art.

In accordance with another feature of the invention, the atmospheres produced in the various zones can be varied at will to produce oxidizing, reducing or neutral conditions, depending on the metal melted. For example, brass scrap can be preheated and melted above the support bed under oxidizing conditions to remove zinc from the brass, to leave copper. The lower burners can then be operated to produce reducing or neutral conditions in the superheating zone to prevent oxidation of the remaining copper in the original brass alloy.

A further feature of this invention is the ability to separately regulate the thermal energy input at each level to accommodate the differences in metal melting requirements. Each metal requires a different level of thermal energy input and each metal requires a percentage of this total for preheating, melting and superheating, as demonstrated by the data of Table I in the detailed specification hereinafter.

Still another feature of the invention is the ability to control flame temperature at each of the two burner levels to suit the metal being melted. Flame temperature at each zone can be controlled by varying the percentage of air in the tuyere. In the case where burners are not used at the lower tuyere level, oxygen enrichment of the blast air can be varied to produce desired flame temperatures in the coke bed.

Some of the advantages of the techniques of the present invention over the teachings of the prior art are as follows:

(1) Light, low density scrap, comprising, for example, borings and turnings, are melted without excessive oxidation.

(2) Low density scrap can be charged without prior conditioning, such as bundling.

(3) The degree of superheating, that is, the final tap temperature at which the liquid metal arrives, can be regulated independently of the melting rate.

(4) The volume of gas passing through the furnace can be changed independently of the total heat input.

(5) The process can be continuously varied in accordance with different requirements to provide a product of the desired analysis.

(6) Air pollution resulting from the furnace use is substantially reduced, since the high flame temperature resulting from oxy-fuel burner use, the reduction of nitrogen in the shaft, and the increase of shaft cross-section above the melting zone all contribute to a reduced smoke and particle emission.

It is contemplated that the processes of the present invention are not necessarily limited to metals of the types which in the prior art have been processed in shaft furnaces; but, that they will apply to all commonly processed scrap metals.

These and other objects, features, and advantages of the invention will be apparent to those skilled in the art by a detailed study of the drawings with reference to the specification hereinafter.

SHORT DESCRIPTION OF THE DRAWINGS

DETAILED DESCRIPTION OF PREFERRED EMBODIMENTS

Figure 1:
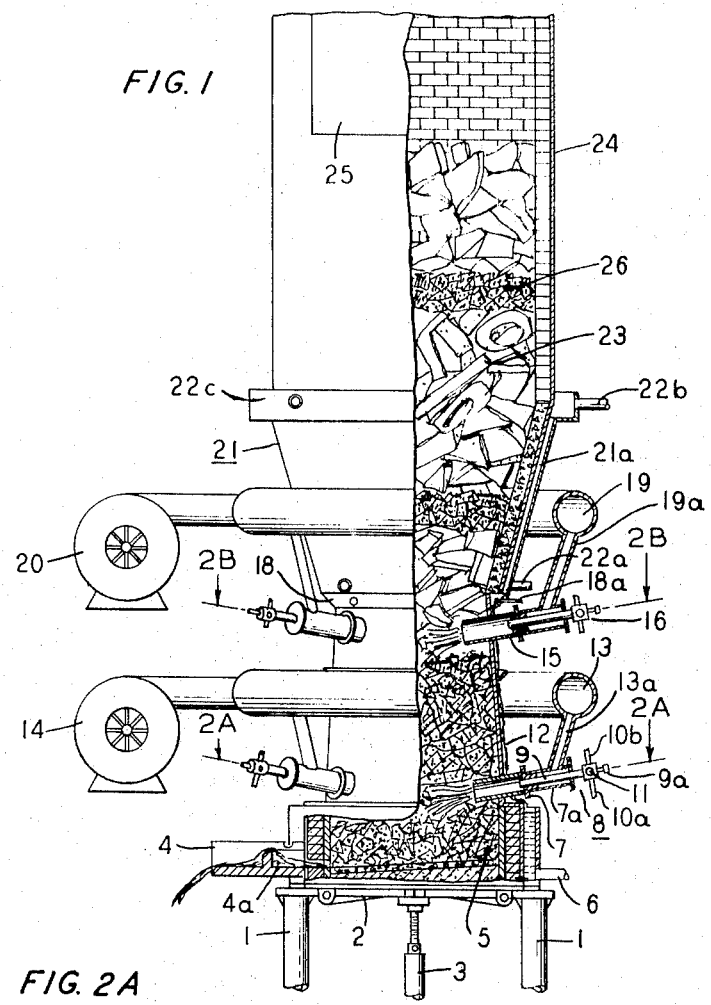
FIG. 1 is a longitudinal sectional showing of a shaft furnace modified in accordance with the teachings of the present invention to include upper and lower rows of oxy-fuel tuyere burners.

In FIG. 1 of the drawings, there is shown a shaft furnace for processing scrap of low density comprising, for example, borings, turnings, sheet bundles, tube mill scrap, bunchings, and sheet trimmings, of any well-known metals, such as, for example, iron, copper, etc.

The design of the furnace construction of the present embodiment, as shown in FIG. 1, will be seen to differ from the ordinary cupola known in the prior art in that the side walls taper outwardly above the coke bed, at an angle of about 15 degrees with the principal vertical axis of the furnace, thereby preventing overheating of the side walls and permitting a larger volume of low density scrap to be loaded into the furnace. The angle may vary over the range 0 to 30 degrees.

Figure 2A:
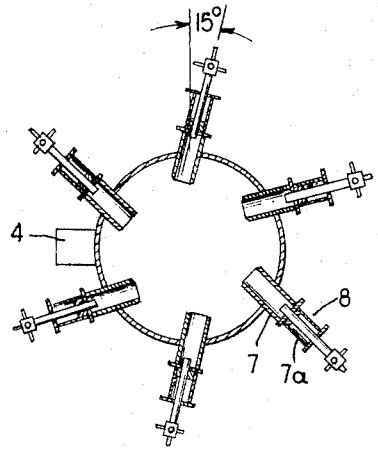
FIG. 2A is a section in the plane of the arrows 2A—2A of FIG. 1, showing the disposition of the oxy-fuel burners at the lower level.

It will be further apparent from a study of FIGS. 2A and 2B, which will be described in detail hereinafter, that the angles of burner placement at the upper and lower levels are such as so to contribute a swirling motion to the gas streams in the shaft. Moreover, as well be described hereinafter, both sets of tuyeres and the enclosed burners are designed to project inwardly, forming an angle of about 15 degrees with the cross-sectional radius for the furnace, and at a downward angle of 10 to 15 degrees in order to prevent the molten liquid from entering into the tuyeres.

Referring to FIG. 1, there is shown in longitudinal section a shaft furnace which rises to in excess of 30 feet above the ground, the stack extending to whatever height is necessary to carry the combustion products above the adjacent building structures. The furnace of the present embodiment is of circular cross-section. Through the hearth section, the furnace has an outer diameter of eight and two-thirds feet, not including an enclosing steel water jacket, 116 inches in outer diameter, which provides an annular clearance of four inches for water cooling. The furnace is supported on a number of metal support columns 1, each about a foot in diameter, which are mounted in a concrete base. The hearth section comprises a shell of boiler plate, about one inch thick, lined with fire bricks to a thickness of about one and one-third feet, and having an inner lining of carbon about four inches thick. This is built up to a height of about four feet above the cast iron base to form a well, the bottom of which is lined with sand in which is formed a channel for the molten iron and slag. A pair of metal doors 2, which are held shut by means of a metal door-prop 3, support the contents of the furnace. The slag which floats on top of the molten iron is drawn off through the slagging-spout 4a, whereas the molten iron is drawn off through tapping spout 4. The cupola well is completely lined with coke. At the lower end of the water jacket is a water-discharge spout 6. A second, slightly frusto-conical section of the furnace comprising boiler plate having walls about three-quarter inches thick, rises concentrically above the hearth portion to a height of seven and one-half feet. The lower cross-sectional dimension of this section is seven feet, narrowing to six feet at the top of the section.

Entering the furnace in a plane about four feet above the base of the furnace, where the inner cross-sectional diameter is 84 inches, is a first array of tuyeres. In the present example these are six in number, being located symmetrically around the periphery of the furnace in the configuration indicated in FIG. 2A of the drawings. In the present example it will be seen that the tuyeres are not directed radially in the horizontal plane, as in most prior-art configurations, but rather with their respective axes each making an angle of, for example, 15 degrees in a clockwise direction with the radius of the circle. It will be apparent that each opposing pair of tuyeres in the present example is so directed that instead of being diametrically opposite, they are pointed along parallel lines which are spaced two feet apart. In addition to this, each of the tuyeres is directed downwardly from the horizontal plane at an angle of 10 to 15 degrees, as indicated hereinbefore.

In the persent example, the double-walled tuyere pipes are of copper, two feet long, 8 inches in outer diameter, and six inches in inner diameter, comprising concentric shells spaced one inch apart and fused together at the inner ends to form a closed, annular water cooling compartment which is connected to the water cooling system. A portion of the tuyere projects along its centerline a distance of, say, one foot, into the furnace. To the outer end of the tuyere pipe 7 is riveted, welded, or screwed a tuyere-extension pipe 7a, which is 22 inches long and eight inches in diameter, which is sealed at the outer end by a flat annular closure. The tuyere extension pipe 7a is connected to a wind pipe 13 through the 6-inch inner diameter downcomer pipe 13a, which extends upwardly and outwardly at an angle of about 60 degrees with pipe 7a. The 21-inch diameter wind pipe 13 surrounds the outer periphery of the furnace concentrically, at a distance about two feet above the top of the tuyere pipes 7 where the latter enter the furnace. Wind is supplied to the wind pipe 13 through a conventional centrifugal type blower 14 at a rate of, for example, between 200 and 4000 standard cubic feet per minute. Wind pipe 13 and the six connected downcomer pipes 13a may be formed of steel.

Arranged concentrically within the tuyere 7 and tuyere extension pipe 7a is the oxy-fuel burner 9. In the present example, this comprises a barrel about three inches in outer diameter, extending from just inside the outer end of the tuyere 7, a distance of 18 inches outwardly and terminating in a burner body assembly which includes the oxy-fuel burner fuel inlet 9a, the oxy-fuel burner water inlet 10a and outlet 10b, and the oxy-fuel burner oxygen inlet 11. The oxy-fuel burner 9 may comprise one of the types well-known in the art, such as, for example, types known as rocket-burners, or self-atomizing tip-mix burners. Suitable types, for the purposes of the present invention, are specifically disclosed in the copending application Ser. No. 602,381 of B. G. Gray, filed Dec. 16, 1966, now Pat. No. 3,547,624. Alternative types of burners which may be adapted to the purposes of the present invention are disclosed, for example, in T. L. Shepherd Patent 3,092,166, issued Jan. 4, 1963; or in W. B. Moen, et al. Patent 3,135,626, issued June 2, 1964.

Moreover, the supply systems respectively connected to the fuel inlet 9a, the oxygen inlet 11, and the water inlet and outlet 10a, 10b, are substantially similar to the systems described in detail in the patent of B. G. Gray, supra.

Figure 2B:
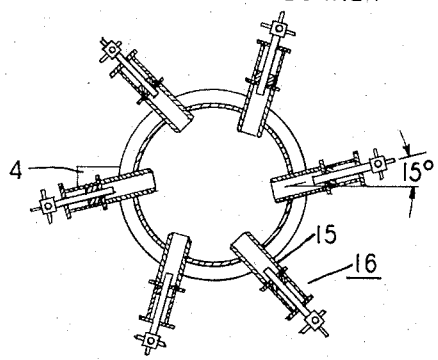
FIG. 2B is a section in the plane of the arrows 2B—2B of FIG. 1, showing the disposition of the oxy-fuel burners at the upper level.

Entering the furance at a plane substantially six feet above the center of the horizontal plane of the tuyere 7, were the inner cross-sectional dimension of the furnace is 72 inches, is an additional set of tuyeres 15 which are arranged in a configuration substantially as shown in FIG. 2B of the drawings. The plane at which the tuyeres 15 enter the furnace is approximately one and one-half inches below the lower end of the bosh section of the furnace. The tuyeres 15 are substantially similar in material and construction to the tuyeres 7 described hereinbefore. The principal difference between the arrangements of the tuyeres 15 and that of the lower set of tuyeres 7 is that the two sets are arranged in offset relation, so that each of the tuyeres in the upper set protrudes into the furnace at a position which lies in a vertical plane approximately half way between the vertical planes of the nearest burners of the lower set of tuyeres. One of the burners of the upper group is mounted directly above the spout 4a; whereas the spout 4a lies between two burners of the lower group. The axis of each of the tuyeres 15 forms a counterclockwise angle in the horizontal plane of 15 degrees with the radial direction; and, the tuyeres are inclined downwardly at angles which are uniform and between 10 and 15 degrees with the horizontal. It will be noted that the angular disposition of the tuyeres at the two levels is different, being clockwise with reference to the radial direction at the lower level, and counterclockwise at the upper level. This is a particular feature of the invention which causes a swirling action of the gases injected into the furnace which aids the melting and superheating action. The high capacity oxy-fuel burners 16 at the upper tuyere level are substantially similar to those described with reference to the lower set of burners, except that they are designed to accommodate volumes of oxygen and fuel roughly three times as great as those accommodated by the lower set of burners. The upper burners are likewise fed with oxygen and fuel through similar outlets, and from similar supply systems to those described with reference to the lower set of burners, and disclosed in detail in B. G. Gray application Ser. No. 602,381, now Pat. No. 3,547,624, supra.

The tuyeres 15 are connected through the downcomer pipes 19a to a 21-inch diameter wind pipe 19 which surrounds the furnace at the upper level about two feet above the top of the tuyeres 15, where they enter the furnace. The dimensions and construction of tuyeres 15, downcomer pipes 19a and wind pipe 19 are substantially the same as their counterparts at the lower tuyere level. Likewise, the centrifugal blower 20, which is connected to supply wind to the wind pipe 19, is similar to blower 14 at the lower level.

It will be noted that whereas the present illustrative example shows the tuyere burner levels approximately six feet apart, this distance can be varied to suit individual metal requirements and furnace size or melt rate requirements.

The outwardly flaring bosh section 21 is a particular feature of the furnace of the present invention. This comprises a double-walled water jacket 21a. Each of the walls comprises a steel plate about three-quarter inch thick. The interior is lined with refractory material, such as alumina, to a thickness of four inches. This section, which has an overall diameter of about seven feet at its lower end, expands in cross-section to about 11 feet at its upper end through a vertical rise of about eight feet, flaring outwardly at an angle about 30 degrees with the vertical. At the lower end of the bosh section is a water curtain distributor ring 18 for the lower section, which is fed by a pipe 18a. Pipes 22a and 22b, respectively, serve as inlet and outlet to the bosh section water jacket 21a. Water pipe 22c surrounds the upper end of the bosh section so that a water curtain is provided through external openings for both the bosh section and the tuyere section of the furnace.

The stack portion of the furnace is substantially nine and one-half feet in outer diameter, comprising a brick wall six inches thick which is encased in a steel shell three-quarter inch thick. As pointed out previously, the shaft or stack portion, which serves to preheat the charge, rises to whatever height is necessary to carry the combustion products above the surrounding structures. At a height of, say, 10½ feet above the lower end of the stack portion, is an opening 25, which is 72 inches wide and 100 inches high, which serves for charging into the furnace the low density scrap metal 23, together with the coke 26, to be processed.

In accordance with the present embodiment, coke comprising chunks having a median diameter of, say, six inches, is first charged into the furnace to a level just below the level of the second ring of tuyeres 15. This coke bed serves two functions. The first is to provide a support medium for the charge above and hot areas of contact to transfer superheat to the descending droplets of molten metal which were melted in the zone adjacent the top burner row. The second function of the coke, particularly in the case of the iron cupola, is to provide a source of carbon to allow solutions of carbon to enter into the melted molten iron or steel droplets. Above the support bed is charged a layer of metal scrap material to be processed, comprising, for example, scrap steel, scrap iron, pig iron, and the like. At alternate planes in the furnace, which are usually two feet or more apart, are interposed layers of coke.

It will be apparent in accordance with the present invention that the scrap material moving down through the stack of the furnace comes in contact with the hot gases which are rising to the top of the furnace, thereby causing this material to become preheated. When the scrap metal charge has moved downwardly in the furnace through the bosh section to the upper level of the tuyeres 15, it absorbs a sufficient amount of heat, particularly from the latter set of tuyeres, to bring it up to the melting point. Accordingly, it leaves the level of the tuyeres 15 in the form of molten metal, trickling down over the layers of coke which fill the furnace up to that point. In the body portion of the furnace, the molten metal is superheated and purified by contact with hot gases rising from the lower set of tuyeres 7, in addition to the oxy-fuel burner jets and air passing into the respective sets of tuyeres from wind pipes 19 and 13. The air and the hot gases serve to remove the impurities by oxidation or to reduce certain types of impurities in the molten charge, depending on the ratio of oxygen to fuel in the burners.

It will be understood that in accordance with variations of the present invention, the burners can be removed from the lower plane of tuyeres, in which case the tuyeres serve merely as vehicles for bringing air in from the respective wind pipe 13 or 19, either hot or cold, at higher or lower velocities, depending on the requirements of the specific material to be processed.

In accordance with another alternative, either the upper or lower set of burners may be operated without auxiliary air.

In accordance with a further alternative, instead of coke or graphite, refractory material such as, for example, lumps of magnesia, lime, calcium carbide or alumina, may be used to fill the lower portion of the furnace approximately up to the level of the tuyeres 15 so that certain undesirable components, such as, for example, sulphur and phosphorus, which are present in the coke, do not come in contact with the charge. Such an arrangement is particularly beneficial when the charge comprises a major portion of copper.

In addition, another example of the use of the charge support medium for desulphurization or dephosphorization is evident in the case in which steel scrap is melted over a support bed of limestone, which has been previously calcined in situ to provide a support bed of calcium oxide. Molten steel droplets passing over the bed are superheated and desulphurized by the rapid movement over the hot calcium oxide when heated with reducing gases from the lower tuyere burners.

Under these conditions, the following reaction occurs:

$$2CaO + 2S \rightarrow 2CaS + O_2 \quad (1)$$

The calcium sulphide is absorbed in the slag. Assuming that the burners have been adjusted to create a reducing atmosphere, the oxygen is removed as carbon dioxide and water vapor.

Assuming that the burners and tuyeres are adjusted to produce an oxidizing environment instead of a reducing environment in the furnace containing the calcium oxide support bed, dephosphorization will occur in accordance with the following reaction:

$$4P + 5O_2 \rightarrow 2P_2O_5 \quad (2)$$

$$2P_2O_5 + 4CaO + O_2 \rightarrow 4CaPO_4 \quad (3)$$

The calcium phosphate becomes a component of the slag.

Furthermore, special support media such as lump calcium carbide can be used to effect simultaneous desulphurization and carburization. Make-up support media material can be added with the charge to replace material which has become slagged or eroded away.

A unique feature of the present invention is that the two levels of oxy-fuel burners may be operated in conjunction with separate wind supplies to provide separate functions. The uppermost row of burners, used with or without air, functions as previously described to provide heat for preheating the charge to the melting point and for supplying a substantial portion of the latent heat of fusion. The function of the lower row of burners, which also may be used with or without air, is to supply the heat required for superheating the material to the proper spout temperature.

A number of metals and their melting requirements is shown in the table below for reference purposes.

TABLE I

[British thermal units requirements per ton of metal, millions]

| | Steel | Cast iron | Copper | Aluminum |
|---|---|---|---|---|
| Preheat to melting point | .890 | .830 | .394 | .576 |
| Latent of fusion | .236 | .083 | .182 | .340 |
| Superheat to pour temperature | .114 | .252 | .066 | .084 |
| Total heat required | 1.240 | 1.165 | .642 | 1.000 |
| Melting point-degrees Fahrenheit | 2,800 | 2,246 | 1,981 | 1,220 |
| Pouring temperature, degrees Fahrenheit | 3,100 | 2,800 | 2,200 | 1,380 |

In the prior art, a conventional water cooled cupola requires that approximately 3.5 million British thermal units be expended to melt one ton of cast iron. This figure is slightly improved in a refractory lined cupola which normally requires only 2.7 million British thermal units per ton of iron. Since cast iron theoretically requires only 1.165 million British thermal units per hour, the efficiencies of these prior art systems are only 33.3 percent and 43.2 percent, respectively.

It is estimated that efficiencies of operation of the shaft furnace of the present invention approximate 75 percent. Moreover, it is estimated that the lower burners contribute about one-third of the latent heat of fusion, plus the superheat; while the upper burners provide two-thirds of the latent heat requirements, plus all of the preheat requirements.

In accordance with a specific example of operation of the present invention, to melt cast iron using a coke charge of about five percent of the metal charge and a melting rate of 40 tons per hour, the required firing rate per hour at each of the burner rows is as follows:

Upper row of tuyere burners

| | Million B.t.u. |
|---|---|
| Preheat—40 tons×.830 | 33.2 |
| Fusion—40 tons×.083×⅔ | 2.21 |
| Total | 35.41 |

Actual firing rate 35.41/.75=47.3 million British thermal units per hour.

Lower row of tuyere burners

| | Million B.t.u. |
|---|---|
| Fusion—40 tons×.083×⅓ | 1.11 |
| Superheat—40 tons×.252 | 10.10 |
| Total | 11.21 |

Actual firing rate 11.21/.75=15.00 million British thermal units per hour.

To supply the British thermal units for the upper burners, it is estimated that a fuel oil having a heating value of 145,000 British thermal units per gallon is added at the rate of 326.5 gallons per hour. Pure oxygen is added to provide 60 percent of the stoichiometric requirement of oxygen for combustion. This amounts to $$326.5 \times 280 \times .60 = 54,700$$

standard cubic feet per hour. The additional oxygen required is 326.5×280×.40=36,600 standard cubic feet per hour. This is supplied by blast air in the amount of 2930 standard cubic feet per minute.

The lower burner fuel requirement is 103.3 gallons per hour. Pure oxygen to provide 60 percent of the stoichiometric requirement amounts to $$103.3 \times 280 \times .60 = 17,400$$

standard cubic feet per hour. Additional oxygen is 103.3×280×.40=11,600 standard cubic feet per hour. This is supplied by blast air in the amount of 925 standard cubic feet per minute.

The total separated oxygen required at both levels of burners is 54,700 standard cubic feet per hour plus 17,400 standard cubic feet per hour or 72,100 standard cubic feet per hour or an equivalent of 1800 standard cubic feet per ton of iron melted.

In accordance with another example, the furnace of the present invention is used for the melting of copper mill scrap. In this case, coke would not be used and the charge support material preferably comprises large lumps of alumina refractory or in some cases, graphite. It is estimated that the efficiency is higher than the iron case, approximately 85 percent. The British thermal units requirements are as follows to melt at the rate of 30 tons per hour:

Upper row of tuyere burners

|   | Million B.t.u. |
|---|---|
| Preheat—30 tons×.394 | 11.81 |
| Fusion—30 tons×.182×⅔ | 3.65 |
| Total | 15.46 |

Actual firing rate 15.46/.85=18.2 million British thermal units per hour.

Lower row of tuyere burners

|   | Million B.t.u. |
|---|---|
| Fusion—30 tons×.182×⅓ | 1.82 |
| Superheat—30 tons×.066 | 1.98 |
| Total | 3.80 |

Actual firing rate 3.8/.85=4.48 million British thermal units per hour.

Using pure oxygen to supply 50 percent of the stoichiometric oxygen requirements and air to supply the remaining 50 percent of the oxygen required for combustion of the natural gas fuel, the fuel, oxygen, and air flows for each level are as follows:

| Tuyere burners | Natural gas, standard cubic feet per hour | Oxygen, standard cubic feet per hour | Air, standard cubic feet per minute |
|---|---|---|---|
| Upper row | 18,200 | 18,200 | 1,450 |
| Lower row | 4,480 | 4,480 | 360 |
| Total | 22,680 | 22,680 | 1,810 |

This assumes the natural gas employed has 1000 British thermal units per cubic feet; and, that 100 percent stoichiometric oxygen equals two volumes $O_2$ per one volume gas.

From the above, it will be apparent that the consumption of separated oxygen amounts to 758 cubic feet per ton of copper.

It will be noted that a particular feature of the furnace construction in accordance with the present invention, is that it differs from the ordinary prior art cupola in that the side walls taper outward above the coke bed, thereby preventing their overheating, and permitting more low density scrap to be loaded into the furnace.

Another feature of the invention is the swirling motion impressed on the gas streams in the shaft by the particular angles at which the burners are disposed in accordance with the present invention, being rotated in a clockwise direction from the radius at one tuyere level and a counterclockwise direction at the other tuyere level, combined with an inclination through an angle of 10 to 15 degrees in each case.

It will be apparent to those skilled in the art that the present invention is not confined to the particular examples described herein by way of illustrative example; but, that the invention is defined in the scope of the appended claims.

What is claimed is:

1. In a method of melting a charge comprising low density scrap metal in a shaft-type furnace which comprises in combination a hearth portion including a spout, a body portion extending to a substantial height above said hearth portion, a bosh portion flaring outwardly to a substantial height above said body portion and terminating at its upper end in an upwardly-extending stack, and including a plurality of tuyeres located in spaced relation around the periphery of said furnace at a first level at the bottom of said body portion and at a second level near the top of said body portion just below said bosh portion;

the improvement in combination therewith comprising the steps of:

supporting said charge in said body portion on a porous bed of solid material, preheating the said charge in said stack portion by means of hot gases rising in said furnace through said porous bed, directing heating means including burners fuelled with substantially pure oxygen into said tuyeres at said first level at the lower end of said body portion to impose a swirling motion in one direction on the gases passing into said furnace at said first level, and directing heating means including burners fuelled with substantially pure oxygen into said tuyeres at said second level near the top of said body portion to impose a swirling motion in the opposite direction on the gases passing into said furnace at said second level, for superheating the molten charge in said bosh portion to a desired spout temperature while it drips down through a support bed of solid material.

2. In the method in accordance with claim 1 wherein the heating means including said burners are directed at one said level so that the principal axis thereof forms an angle of approximately 15° in a clockwise direction with the radius of said furnace, and wherein the heating means including said burners are directed at the other said level so that the principal axis thereof forms an angle of approximately 15° in a counterclockwise direction with the radius of said furnace, and wherein the principal axis of each of said heating means is inclined downwardly at an angle of between 10° and 15° with the horizontal.

3. In the method in accordance with claim 1 which comprises purifying said molten charge in said furnace of impurities selected from the group including phosphorus and sulphur by including in said support bed a material which reacts in said furnace to combine with a respective one of said impurities.

4. In the method in accordance with claim 3 which comprises including in said support bed a substantial proportion of calcium oxide, and adjusting said burners fuelled with substantially pure oxygen to provide a reducing atmosphere for removing sulphur impurity from said charge.

5. In the method in accordance with claim 1 which comprises employing blast air in combination with heat from said burners fuelled with substantially pure oxygen for melting said charge in an area just below said bosh portion, and for superheating said molten charge in said body portion.

6. In the method in accordance with claim 3 which comprises including in said support bed a substantial proportion of calcium oxide, and adjusting said burners fuelled with substantially pure oxygen to provide an oxidizing atmosphere for removing phosphorus from said charge.

References Cited
UNITED STATES PATENTS

| 2,283,163 | 5/1942 | Brassert et al. | 75—44 S |
| 1,948,696 | 2/1934 | Brassert et al. | 75—42 X |
| 502,482 | 8/1893 | Dauber | 75—41 |
| 749,258 | 1/1904 | Cochran | 75—43 X |
| 1,117,274 | 11/1914 | Stoughton | 75—43 |

(Other references on following page)

UNITED STATES PATENTS

| | | | |
|---|---|---|---|
| 1,507,397 | 9/1924 | Moldenke | 75—43 |
| 1,640,251 | 8/1927 | Poumay | 75—43 X |
| 1,948,697 | 2/1934 | Brassert | 75—40 |
| 1,991,008 | 2/1935 | Brassert | 75—40 |
| 2,795,497 | 6/1957 | Elvander | 75—41 |
| 3,232,595 | 2/1966 | Balster | 75—43 X |
| 3,367,769 | 2/1968 | Schott | 75—43 |
| 2,643,185 | 6/1953 | Carter | 75—43 |
| 3,089,766 | 5/1963 | De Wald | 75—43 |
| 3,547,624 | 12/1970 | Gray | 75—43 X |
| 3,418,108 | 12/1968 | Von Stroh | 75—43 |
| 3,454,395 | 7/1969 | Von Stroh | 75—43 X |

FOREIGN PATENTS

| | | | |
|---|---|---|---|
| 998,213 | 7/1965 | Great Britain | 75—43 |
| 997,468 | 7/1965 | Great Britain | 75—43 |

L. DEWAYNE RUTLEDGE, Primary Examiner

M. J. ANDREWS, Assistant Examiner